United States Patent
Qi

(10) Patent No.: US 10,473,014 B2
(45) Date of Patent: Nov. 12, 2019

(54) LOW PRESSURE ATOMIZING INJECTOR

(71) Applicant: Baohua Qi, Marietta, GA (US)

(72) Inventor: Baohua Qi, Marietta, GA (US)

( * ) Notice: Subject to any disclaimer, the term of this patent is extended or adjusted under 35 U.S.C. 154(b) by 355 days.

(21) Appl. No.: 15/288,035

(22) Filed: Oct. 7, 2016

(65) Prior Publication Data

US 2017/0022867 A1    Jan. 26, 2017

Related U.S. Application Data

(63) Continuation-in-part of application No. 14/565,938, filed on Dec. 10, 2014, now Pat. No. 9,488,086.

(60) Provisional application No. 61/920,424, filed on Dec. 23, 2013.

(51) Int. Cl.
*F01N 3/20* (2006.01)
*F01N 3/28* (2006.01)

(52) U.S. Cl.
CPC ............. *F01N 3/208* (2013.01); *F01N 3/206* (2013.01); *F01N 3/28* (2013.01)

(58) Field of Classification Search
CPC ......... F01N 2610/02; F01N 2610/1453; F01N 3/2066; F01N 2610/00; F01N 3/206; F01N 3/208; F01N 3/28; Y02T 10/24
See application file for complete search history.

(56) References Cited

U.S. PATENT DOCUMENTS

| | | | | |
|---|---|---|---|---|
| 5,484,108 | A * | 1/1996 | Nally | F02M 61/1853 239/553.3 |
| 6,354,079 | B1 * | 3/2002 | Choi | B01D 53/90 60/286 |
| 7,017,335 | B2 * | 3/2006 | Huber | B01D 53/9431 60/274 |
| 7,571,599 | B2 * | 8/2009 | Hirata | B01D 53/90 60/286 |
| 7,866,333 | B2 * | 1/2011 | Boe | F01N 3/208 137/1 |
| 8,740,113 | B2 * | 6/2014 | Roessle | F01N 3/2066 239/585.1 |
| 9,677,444 | B2 * | 6/2017 | Dea | F01N 3/208 |
| 2005/0252201 | A1 * | 11/2005 | Lecea | F01N 3/2066 60/286 |
| 2010/0122521 | A1 * | 5/2010 | Sun | F01N 3/208 60/284 |
| 2010/0266458 | A1 * | 10/2010 | Takeshita | E02F 9/0866 422/109 |

(Continued)

*Primary Examiner* — Jesse S Bogue

(57) ABSTRACT

An injector for delivering a working fluid into a working environment is disclosed. According to one embodiment of the present invention, the injector includes a pre-metering chamber with a control valve controlling fluid delivery rate and a swirl chamber, in which a swirling flow is created and atomization is achieved at low injector pressure when it is released. In another embodiment, the injector includes a swirl chamber and an atomization element with a bore, through which a control valve is positioned. The control valve forces a working fluid flow through the atomization element when the injector is energized to create a metered swirling flow. To avoid issues with deteriorated working fluid, a purging apparatus is used for emptying working fluid residue in the injector, and a special control method is used when the injector works in a high-temperature working environment.

13 Claims, 10 Drawing Sheets

(56) References Cited

U.S. PATENT DOCUMENTS

| | | | | |
|---|---|---|---|---|
| 2010/0314470 A1* | 12/2010 | Cavanagh | ............. | B05B 1/3436 239/490 |
| 2011/0016854 A1* | 1/2011 | Gaudin | ................... | F01N 3/025 60/299 |
| 2011/0107742 A1* | 5/2011 | Igarashi | ................. | F01N 3/208 60/277 |
| 2012/0036838 A1* | 2/2012 | Furuya | .................... | F01N 3/208 60/285 |
| 2013/0283771 A1* | 10/2013 | Nagata | ................. | F01N 3/2066 60/282 |
| 2014/0165539 A1* | 6/2014 | Nagata | ................... | F01N 3/208 60/286 |

* cited by examiner

LOW PRESSURE ATOMIZING INJECTOR

CROSS-REFERENCE TO RELATED APPLICATIONS

This application is a continuation-in-part of application Ser. No. 14/565,938, filed Dec. 10, 2014.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD OF THE INVENTION

This application is a continuation-in-part of application Ser. No. 14/565,938, filed Dec. 10, 2014, which also claims priority from U.S. provisional application No. 61/920,424 having the same title as the present invention and filed on Dec. 23, 2013.

The present invention relates to a working fluid injection apparatus, and more specifically, to an apparatus including an injection device for controlling a flow rate of a working fluid and atomizing the working fluid.

BACKGROUND OF THE INVENTION

In an engine system, especially in a compression-ignition engine, such as a diesel engine, injectors are used in engine cylinders and exhaust gas processing systems. In both applications, the main functions of the injector include controlling a flow rate of a working fluid and atomizing the working fluid (the injectors are also called atomizing injectors).

In applications of in-cylinder fuel injections, a variety of methods can be used for controlling flow rate. Among them, a pre-metering method, in which a fluid is metered and then injected, and a common-rail method, in which a flow rate is controlled by adjusting an opening time of an injector in a repeating cycle, are commonly used. Fuel atomization in these applications is normally achieved at high injection pressure.

In exhaust gas processing systems, however, injection pressure is limited. For example, in a DPF (Diesel Particulate Filter) system, especially in a DPF system of an engine with a common rail fuel system, to regenerate the DPF, an external doser can be used for delivering fuel into a combustion device, which normally includes a DOC or a fuel burner. In the external doser, typically a lifting pump in the engine fuel system, which is primarily used for delivering low pressure diesel fuel to high pressure pumps, is employed for providing fuel to an injector, through which fuel delivery rate is controlled. The lifting pressure is much lower than the in-cylinder injection pressure. In a SCR (Selective Catalytic Reduction) system, DEF (Diesel Exhaust Fluid), which is a 32.5% wt urea solution, needs to be delivered to exhaust gas to reduce NOx therein. Limited to penetration distance, cost, and device size, normally only low pressure pumps (lower than 10 bars) are used in DEF delivery.

Though injection pressure is low, exhaust gas processing systems are sensitive to working fluid atomization. In a DPF system, poor atomization causes delay in fuel oxidation in catalyst and fuel carbonization (coking), which may block doser nozzles and deteriorate temperature control performance, while in a SCR system, large droplet of DEF lowers deNOx efficiency and increases chances of urea crystallization, which may block injectors, catalysts, and even exhaust passages.

To obtain good atomization at low injection pressure, a variety of technologies can be used. One of the most commonly used technologies is using compressed air to assist working fluid injection. In this technology, the working fluid metered by a metering pump or a metering injector is mixed with compressed air, and the result mixture is then delivered to exhaust gas. However, in the air-assisted technology, compressed air also goes into exhaust gas with the working fluid. The compressed air lowers exhaust temperature, which is critical to reactions in the exhaust gas processing system, resulting in evaporation issues, poor thermolysis, and higher energy cost, and evaporates working fluid in a mixing chamber in which the working fluid mixes with the compressed air, causing deposit and crystallization therein. Additionally, changes in compressed air pressure also vary pressure downstream from a metering injector when it is used for controlling the DEF flow rate, introducing control errors.

Another technology is using an atomization means together with an injector, as disclosed in the U.S. Pat. Nos. 8,047,452, and 6,279,603, in which an atomization device is used for creating small DEF droplets. In this technology, the working fluid has to cycle through the injector downstream from a possible pressure sensor, sensing values obtained from which are used for compensating flow rate control. Cycling the working fluid through the injector carries heat away therefrom, however, heating working fluid may cause fluid quality issues, since some working fluid deteriorates at high temperature, for example, deterioration of DEF starts to accelerate at a temperature higher than 50° C., while working fluid cycling downstream from the pressure sensor causes variations in pressure difference across the injector nozzle undetected, resulting in errors in flow rate control.

Additionally, after a fluid delivery process completes, or a long time without energizing the injector, working fluid residue in the injector may be solidified, blocking the working fluid from flowing through. The solidification process is shorted when the temperature of the working environment, in which the injector is exposed, is high.

To solve the problems mentioned above, a primary object of the present invention is to provide a working fluid injector with which a good atomization can be achieved at low injection pressure without using compressed air.

A further objective of the present invention is to provide a working fluid injector pressure drop across which can be detected accurately through a pressure sensor upstream, thereby accurate flow rate control can be obtained.

Another objective of the present invention is to provide a working fluid injector that is able to create self-spinning of working fluid droplets to decrease spray angle and penetration distance, and improve atomization at low injection pressure.

Yet another objective of the present invention is to provide a purging apparatus that is able to empty an injector when the risk of working fluid solidification is high.

Yet another objective of the present invention is to provide a control method for a working fluid injector to avoid solidification of the working fluid in a working environment with high temperature.

BRIEF SUMMARY OF THE INVENTION

The present invention provides a working fluid delivery apparatus including an injector for controlling flow rate and atomizing the working fluid. In particular, the injector of the present invention is an enhanced flow controller and atomizer working at low injection pressure for applications with engines, such as natural gas engines, and gasoline engines, and exhaust gas processing systems, such as DPF systems, SCR systems, and LNT (Lean NOx Trap) systems.

According to one embodiment of the present invention, an injector with a pre-atomizing chamber and a swirl chamber is provided. In this injector, the pre-atomizing chamber is enclosed by an upper injector body with a first exit nozzle and an atomization element, which is used for creating a swirling flow in the swirl chamber. Through the first exit nozzle, a high flow velocity can be obtained at low injection pressure, and in the pre-atomizing chamber, the impingement of the working fluid on the atomization element further improves atomization performance. Through the pre-atomizing chamber and the atomization element, the working fluid then enters the swirl chamber and is further released to a working environment via a second exit nozzle on the bottom of the swirl chamber. In the injector, a flow-back is not necessary, while the injector can be fit in an adaptor, which may have coolant circling inside for carrying heat away. Without effects of the flow-back, a pressure sensor can be positioned upstream from the injector to accurately measure the injection pressure, and thereby flow rate control can be accurately compensated.

According to another embodiment of the present invention, an injector with a control valve positioned through an atomization element is provided. In the injector, a swirl chamber is enclosed by the atomization element and an injector body, and an exit nozzle is positioned at the bottom of the swirl chamber. At a closed position, i.e., when the injector is de-energized, a front end portion of the control valve is in contact with a valve seat at the bottom of the swirl chamber, blocking working fluid from flowing out. After the injector is energized, the control valve is lifted up, contacting the front end portion to a valve seat at the bottom of the atomization element, blocking working fluid from flowing through a bore in the atomization element, through which the control valve is positioned, and forcing working fluid entering the swirl chamber through swirling grooves of the atomization element. The result swirling flow is then released to a working environment through the exit nozzle. As the one according to the first embodiment of the present invention, this injector has no flow-back, and thereby flow rate can be controlled accurately with sensing values obtained from a pressure sensor positioned upstream from the injector.

According to the third embodiment of the present invention, to keep solidified working fluid from blocking an injector, a purging apparatus is used for emptying working fluid residue from the injector after a working fluid delivery process completes or the injector has been de-energized for longer than a predetermined period of time. In one embodiment of the purging apparatus, a fluid flow control unit can be controlled reverting flow direction of the working fluid. Thereby working fluid residue can be drawn back to a working fluid reservoir. In another embodiment, the purging apparatus includes a mixed fluid chamber, which holds the working fluid and a pressure fluid, such as a compressed air. Working fluid residue can be pressed out with the pressure fluid in a purging process. Additionally, to further avoid working fluid from getting solidified at high temperature, the injector is also energized for a period of time if the duration, in which a temperature of a working environment of the injector is higher than a threshold value and the delivery rate of the working fluid is lower than another threshold value, is longer than a predetermined period of time.

The foregoing and other objects, features, and advantages will be apparent from the following more detailed description of the preferred embodiments of the invention, as illustrated in the accompanying drawings, in which like reference characters refer to the same parts throughout the different views. The drawings are not necessarily to scale, emphasis instead being placed upon illustrating the principles of the embodiments.

DETAILED DESCRIPTION OF THE INVENTION

Figure 1A:
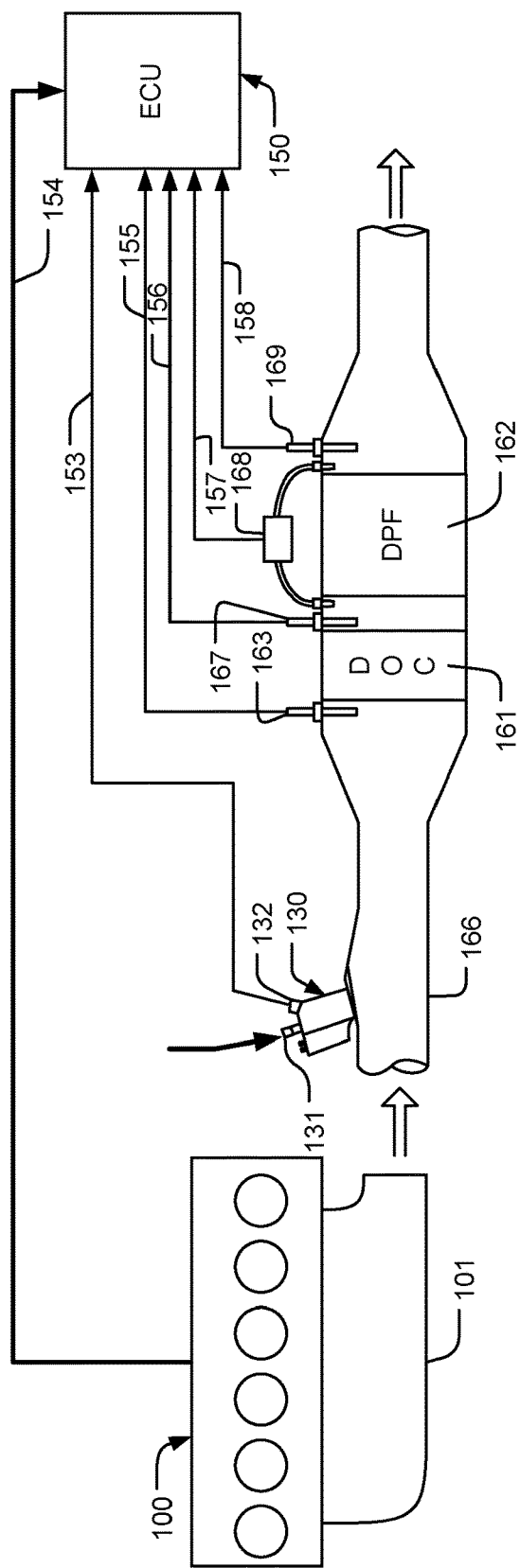
FIG. 1a is a schematic representation of a DPF control system with an external fuel injector.

Referring to FIG. 1a, in a diesel engine DPF system, an engine 100 with its exhaust manifold fluidly coupled to an exhaust passage 166, which is then fluidly connected to a catalyst package having a DOC 161 and a DPF 162 contained. A fuel injection device 130 with an injector 131 enclosed in an adaptor, which may have coolant cycling inside for carrying heat away, is used for delivering fuel in regenerating the DPF from a reservoir or a tank (not shown), when the PM (Particulate Matter) collected therein is above a certain level. The injector 131 is controlled by an ECU (Engine Control Unit) 150 through signal lines 153 connected to a connection port 132, while sensing signals are obtained from the engine 100 by the ECU 150 through signal lines 154. Upstream from the DOC 161, a temperature sensor 163, which is electrically connected to the ECU 150 through signal lines 155, is used for measuring exhaust gas temperature at the inlet of the DOC 161, and temperature sensing signals obtained from two temperature sensors 169 and 167, which are positioned respectively downstream from the DPF 162, and in between the DOC 161 and the DPF 162, are sent to the ECU 150 through signal lines 158 and 156 respectively. To further detect pressure drop across the DPF 162, which is an indication of PM loading level in the DPF 162, two probes of a deltaP sensor 168, which is electrically linked to the ECU 150 through signal lines 157, are positioned upstream and downstream from the DPF 162.

In the exhaust gas processing system of FIG. 1a, a function of the DOC 161 is to oxidize fuel delivered by the injection device 130 for generating heat in regenerating the DPF 162, and other combustion devices, such as diesel fuel burners, can also be used for this purpose. To reliably and accurately control the DPF temperature, accurate fuel injection rate and small droplets are preferred, while typically, the injection rate is controlled by a flow rate controller, which can be achieved with the ECU 150, adjusting a ratio of an energizing time (when a high level control signal is applied by the ECU 150 through the signal lines 153) to an de-energizing time (when a low level control signal is applied) of the injector 131 in a repeating cycle, according to a dosing flow rate command, which can be calculated with sensing values obtained from sensors 163, 167, 169, and 168, and sensors in the engine 100.

Figure 1B:
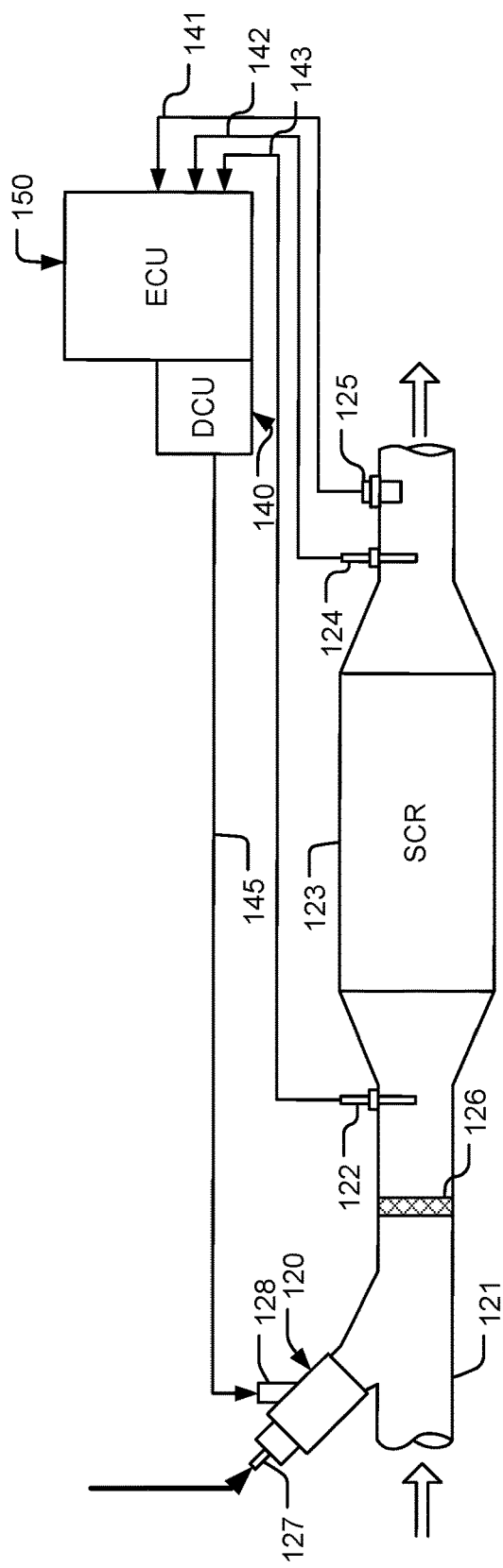
FIG. 1b is a schematic representation of a SCR control system with an airless DEF injector.

In engine exhaust gas processing systems, injectors are also used in delivering DEF in a SCR system. Referring to FIG. 1b, in an SCR system, a decomposition pipe 121 is fluidly connected to a SCR package 123, and an injection device 120 with an injector 127 enclosed in an adaptor, which may have coolant cycling inside, is installed on the decomposition pipe 121 for delivering DEF to exhaust gas from a reservoir or a tank (not shown). The injector 127 is controlled by a DCU (Dosing Control Unit) 140 through signal lines 145 connected to a connection port 128, and downstream from the injection device 120, a mixer 126 is used for creating a uniform exhaust flow. Temperature sensors 122 and 124, which are positioned upstream and downstream of the SCR packages 123 respectively, are used by the ECU 150 for obtaining temperature sensing information through signal lines 143 and 142, while NOx concentration downstream from the SCR package 123 is measured by a NOx sensor 125, which communicates to the ECU 150 through signal lines 141.

In the SCR system of FIG. 1b, injection rate of DEF can be controlled through adjusting a ratio of an energizing time (when a high level control signal is applied by the DCU 140 through the signal lines 145) to a de-energizing time (when a low level control signal is applied) of the injector 120 in a repeating cycle, according to a dosing flow rate command, which is a function of the temperature and NOx sensing values obtained from the sensors 122, 124 and 125. And as that in the DPF system of FIG. 1a, injection accuracy and droplet size are important performances of the injection device 120. To have high deNOx efficiency and low ammonia slip level, accurate DEF injection rate and small droplet size are required.

Figure 2A:
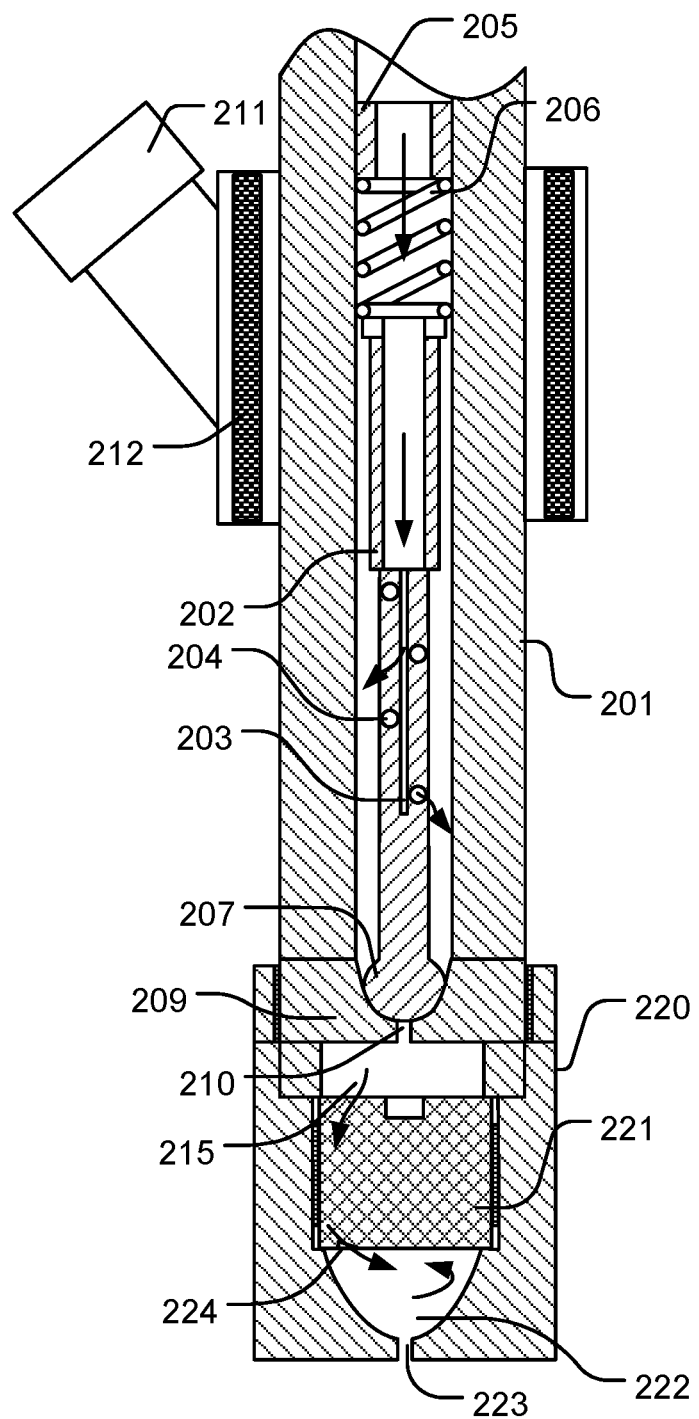
FIG. 2a depicts a cross sectional elevation view of a working fluid injector with a pre-metering chamber and a swirl chamber.

In accordance with an embodiment of the present invention, an atomization device is used with an injection module for obtaining smaller droplet size. Referring to FIG. 2a, in a normally closed injector, an upper injector body 201 is connected to a lower injector body 220. In the upper injector body 201, a restoring spring 206 is positioned under a restraint sleeve 205, downward pressing a valve needle 202, which has a front end portion 207. At a closed position, the front end portion 207 contacts a valve seat 209 of the upper injector body 201, blocking fluid inside the upper injector body 201 from flowing out. On the bottom of the valve seat 209, a first exit nozzle 210, which may have multiple orifices, is fluidly connected to a pre-metering chamber 215, which is in between the valve seat 209 and an upper end of an atomization element 221 enclosed by the lower injector body 220. In the bottom of the lower injector body 220, a swirl chamber 222 is formed under a bottom end of the atomization element 221, and a second exit nozzle 223 under the chamber 222 is used for releasing fluid. Outside the upper injector body 201, a solenoid coil 212, which has control signals applied through a connection port 211, is used for controlling the movement of the valve needle 202.

As shown in FIG. 2a, under pressure, a working fluid enters the upper injector body 201 through the constraint sleeve 205, the restoring spring 206, holes 204 on the valve needle 202, and grooves 203 on the valve needle 202. When a control voltage is applied on the solenoid 212, the needle valve 202 moves upward, forming a gap in between the front end portion 207 and the valve seat 209. The working fluid then enters the pre-metering chamber 215 through the gap and the first exit nozzle 210, and further enters the swirl chamber 222 via the atomization element 221. Through the second exit nozzle 223, the working fluid is released.

Figure 2B:
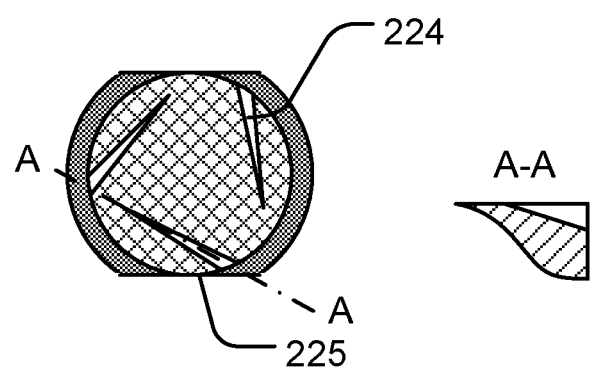
FIG. 2b shows a top view and a cross-sectional view of an atomization element in a working fluid injector with a pre-metering chamber and a swirl chamber.

In the injection device of FIG. 2a, the function of the atomization element 221 is to create a swirling flow for better atomization. A variety of atomization elements 221 can be used for this purpose, and an exemplary design is shown in FIG. 2b. In the atomization element 221 of FIG. 2b, two cutoff sides 225 form two passages with the lower injector body 220, allowing the working fluid to flow from the first chamber 215 to the second chamber 222. On the bottom end of the atomization element 221, three swirling grooves 224 are used to guide the working fluid flow towards the swirl chamber 222, in which a swirl forms, and the swirling flow is sprayed out through the second exit nozzle 223, breaking into small droplets under centrifugal force and shearing of the working fluid by air.

In the injector of FIG. 2a, the function of the first exit nozzle 210 is to obtain higher flow velocity before the working fluid enters the swirl chamber 222. High flow velocity creates self-spinning droplets in the pre-metering chamber 215 when the working fluid flow impinges the upper end of the atomization element 221 and fast swirling in the swirl chamber 222, resulting in small droplets and narrow spray angle. However, when the injector is de-energized off, since the working fluid is blocked at the nozzle 210, a residue could exist in the lower injector body 220, contacting the working environment through the second exit nozzle 223. To avoid issues caused by this working fluid residue, e.g., evaporation caused urea deposit after a long off time in a SCR system, after an injection process completes, it is preferred to have a purging process emptying the injector. In this purging process, the working fluid residue in the injector can be either drawn back to a working fluid tank through a reverting value, which controls fluid flowing directions, or sprayed into working environment with compressed air.

Figure 3A:
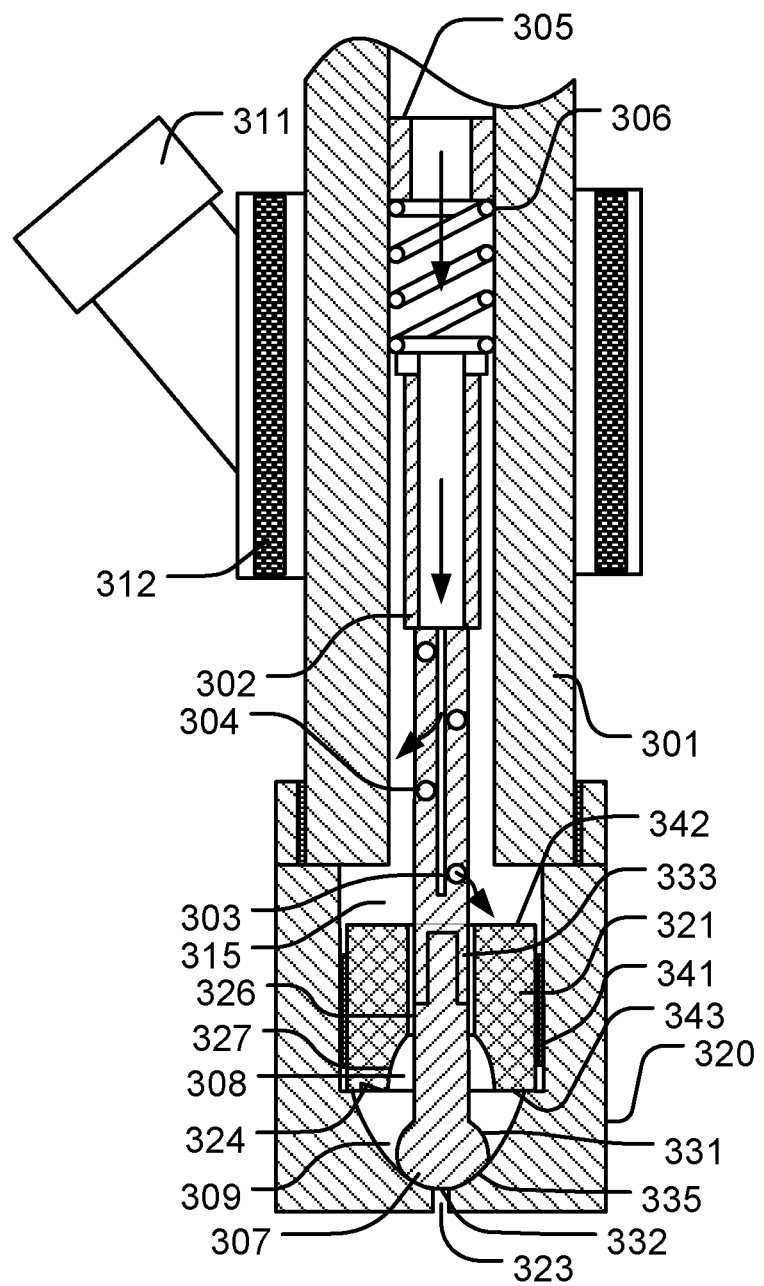
FIG. 3a depicts a cross sectional elevation view of a de-energized working fluid injector with a single swirl chamber.

The working fluid in the injector of FIG. 2a can also be blocked with a needle valve to keep it from directly contacting the working environment after the injector is de-energized off. Referring to FIG. 3a, in another embodiment of the present invention, an injector includes an upper injector body 301, and a lower injector body 320. A needle valve 302, which is positioned under a restoring spring 306 and a restraint sleeve 305, has a valve stem 333 and a front end portion 307 with a bottom surface 332 contacting a bottom inner face 335 of the lower injector body 320 when the injector is de-energized off, blocking the inside working fluid from contacting its working environment. In FIG. 3a, as that in FIG. 2a, the injector also has a solenoid coil 312 with control voltage applied through a connection port 311 for controlling the movement of the needle valve 302, while in the lower injector body 320, an atomization element 321, which has a bore 326 extended from an upper end 342 to a receiving cavity 308 on a bottom end 343, is positioned around the needle valve 302. Referring to FIG. 3c, the atomization element 321 further has two cutoff sides 325 forming two passages 341 with the lower injector body 320, and on the bottom end 343 of the atomization element 321, three swirling grooves 324 are used to guides the working fluid.

Figure 3B:
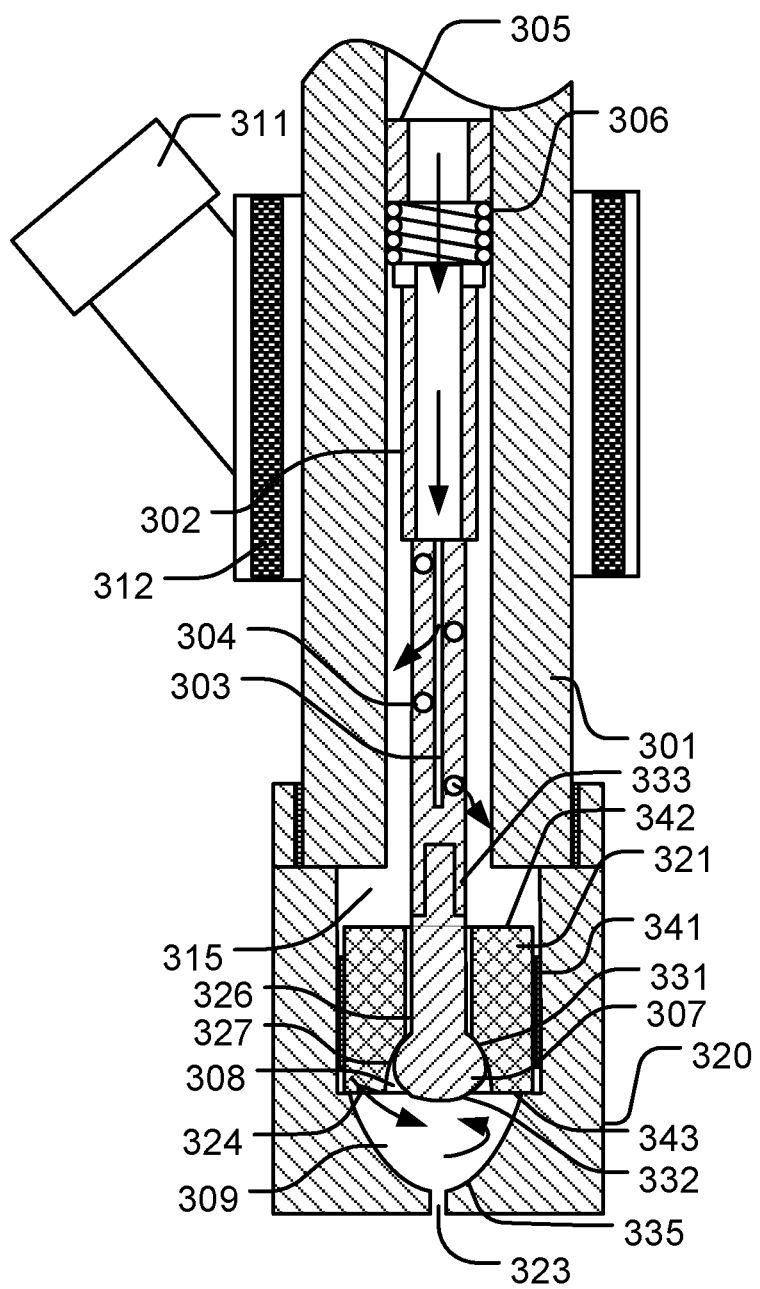
FIG. 3b depicts a cross sectional elevation view of an energized working fluid injector with a single swirl chamber.
Figure 3C:
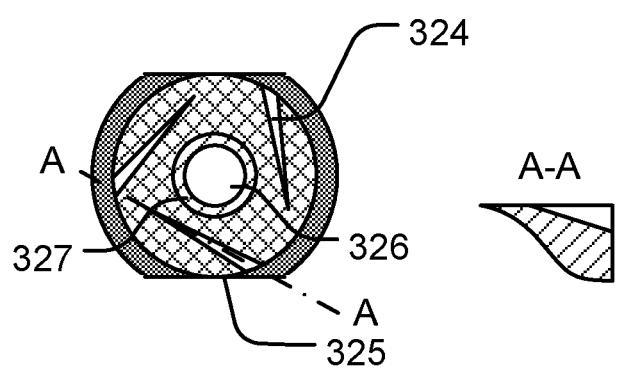
FIG. 3c shows a top view and a cross-sectional view of an atomization element in a working fluid injector with a single swirl chamber.

When the injector of FIG. 3a is energized, as shown in FIG. 3b, the needle valve 302 moves upward till the end portion 307 retracts into the receiving cavity 308 and an upper surface 331 of the front end portion 307 contacts a valve seat 327 in the receiving cavity 308. Under pressure, the working fluid enters the upper injector body 301 through the restraint sleeve 305, grooves 303 and holes 304 on the needle valve 302, and goes into a middle chamber 315 and further into a swirl chamber 309 enclosed by the atomization element 321 and the lower injector body 320. The front end portion 307 blocks the bore 326, forcing the working fluid to flow through the two passages 341 enclosed by the cutoff sides 325 and the lower injector body 320, and the swirling grooves 324, creating a swirl in the swirl chamber 309 thereby. The swirling flow then is sprayed out through an exit nozzle 323 on the bottom of the lower injector body 320.

Typically, to accurately control injection rate of the working fluid, a pressure compensation, in which a pressure inside an injector is used for compensating energizing time of the injector, is needed. And the pressure compensation requires small pressure drop inside the injector, since a pressure sensor normally is located upstream from the injector. To lower pressure drop, in the injector of FIG. 2a, the size of the second exit nozzle 223 should be much smaller than that of the first exit nozzle 210 and the effective cross section area of the two passages enclosed by the cutoff sides 225 and the lower injector body 220, while the injector of FIG. 3a should have a much smaller nozzle 323 compared to the effective cross section area of the two passages enclosed by the cutoff sides 325 and the lower injector body 320. Since in the injectors of FIG. 2a and FIG. 3a, there is no air assistance means positioned downstream and flowback nozzles, when pressure variation in the working environment and pressure drop in the injector are negligible compared to the pressure inside the injector, accurate pressure drop across the injection nozzles (e.g. the second exit nozzle 223 in FIG. 2a and the exit nozzle 323 in FIG. 3a) can be obtained with pressure sensing values obtained from a pressure sensor upstream from the injector, and thereby injection rate can be accurately compensated.

After a dosing process completes or the injector in the dosing system stalls for a long time, to avoid fluid residue inside an injector from being contaminated (e.g. in a DPF system of FIG. 1a) or causing damage when it is frozen or polymerized (e.g. in a SCR system of FIG. 1b), the injector needs to be purged. Two methods can be used for purging the injector. One is drawing the fluid residue back to a tank, while the other one is pressing it out into an exhaust pipe.

Figure 4A:
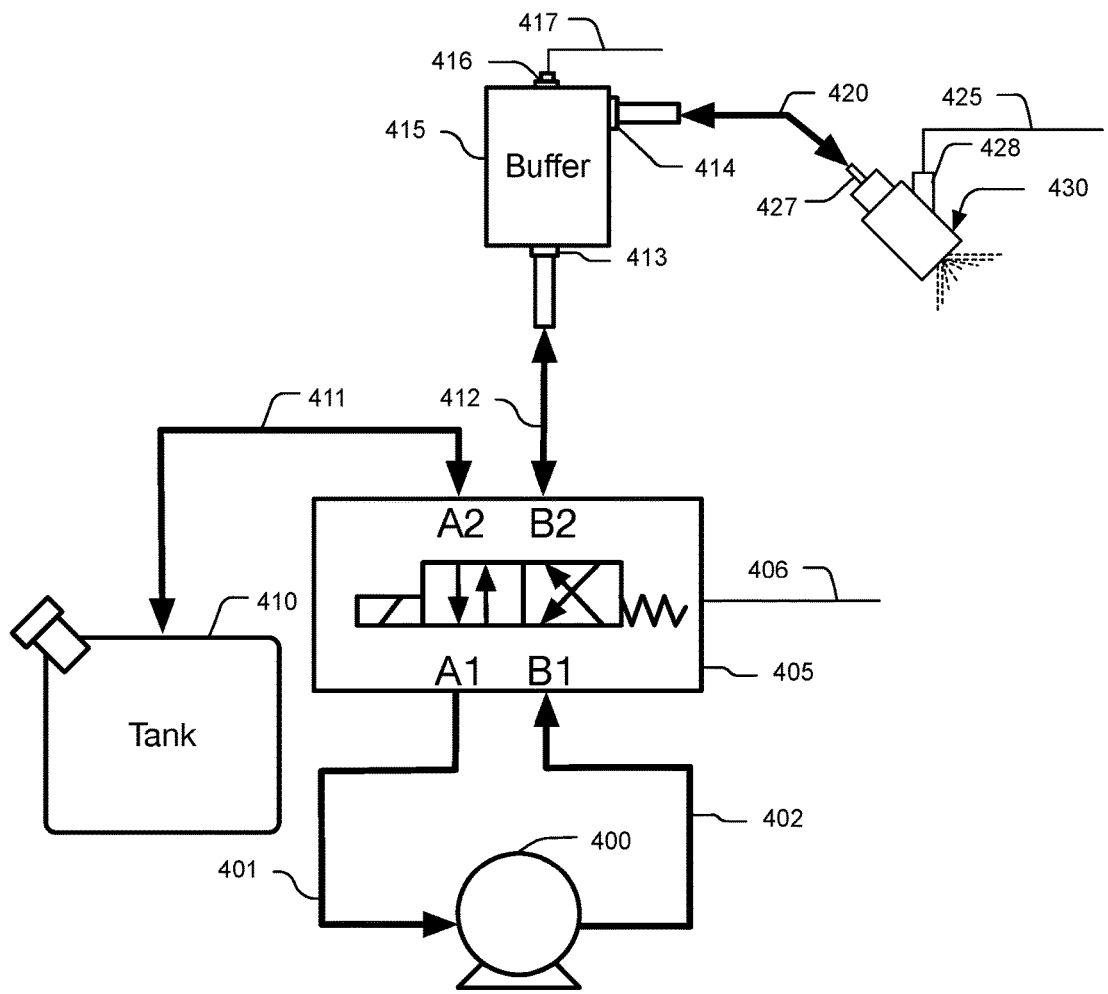
FIG. 4a is a schematic representation of a working fluid delivery apparatus with purging functions realized by operating a pump, a fluid flow control unit, and an injector.

As shown in FIG. 4a, in an apparatus using the first purging method, an injector 430 electrically connected to a fluid delivery controller (e.g. a DCU or ECU, not shown) through signal lines and a port 428 has an inlet port 427 fluidly connected to a hydraulic buffer 415 though a pressure line 420. The buffer 415 has a pressure sensor in communication to the fluid delivery controller with signal lines 417 electrically connected to a port 416, and a port 413 of the buffer 415 is fluidly connected to a B2 port of a fluid flow control unit 405 through a buffer pressure line 412. The fluid flow control unit 405 further has an A2 port fluidly connected to a tank 410 through a supply line 411 and an A1 port fluidly connected to an inlet of a pump 400 though a feed line 401, while an outlet of the pump 400 is fluidly connected to a B1 port of the fluid flow control unit 405 through a pump pressure line 402. The fluid flow control unit 405 is electrically controlled by the fluid delivery controller through signal lines 406.

In a dosing process, the fluid flow control unit 405 is de-energized and the A2 and B2 ports are fluidly connected the A1 and B1 port respectively. Thereby, the pump 400 draws a working fluid from the tank 410 through the supply line 411, the A2 and A1 ports of the fluid flow control unit 405, and the feed line 401, and presses it into the buffer 415 through the pump pressure line 402, the B1 and B2 ports of the fluid flow control unit 405, the buffer pressure line 412, and the port 413. The working fluid in the buffer 415 is then delivered into an exhaust pipe when the injector 430 is energized open. After a dosing process completes or the injector is de-energized for a long time, a purging process is started. In the purging process, the fluid flow control unit 405 is energized, and the A2 and B2 ports are connected to the B1 and A1 ports respectively. The injector 430 is then energized open, and under a pressure created by the pump 400, the working fluid is drawn back from the buffer 415 and the injector 430 through the port 413, the pump pressure line 412, the B2 and A1 ports, and the feed line 401, and pressed into the tank 410 through the pump pressure line 402, the B1 and A2 ports, and the supply line 411. After the buffer 415 and the injector 430 are emptied, the injector 430, the fluid control unit 405, and the buffer 415 are de-energized and the purging process completes.

Figure 4B:
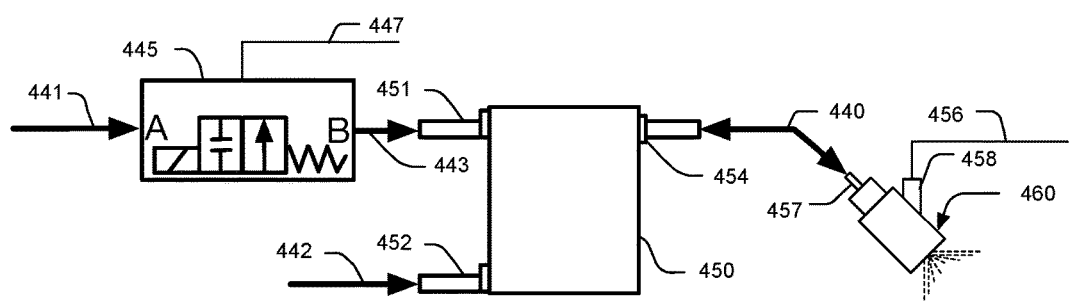
FIG. 4b is a schematic representation of a working fluid delivery apparatus with purging functions realized by operating an air flow control unit, and an injector.

In an apparatus using the second purging method, referring to FIG. 4b, an injector 460 with a port 458 electrically connected to a fluid delivery controller (e.g. a DCU or an ECU, not shown) through signal lines 456 is used for delivering a fluid to an exhaust pipe (not shown). The injector 460 also has a port 457 fluidly connected to a port 454 of a chamber 450 through a pressure line 440. The chamber 450 further has a port 451 fluidly connected to a B port of an air flow control unit 445 through an air line 443, and a port 452 fluidly connected to a fluid line 442, with which a fluid is provided from a tank (not shown). The air flow control unit 445 has an A port fluidly connected to a compressed air source (not shown) through an air line 441. And under the control of the fluid delivery controller, which is electrically connected to the air flow control unit 445 through signal lines 447, an air flow is allowed to pass therethrough if the air flow control unit 445 is energized and the air flow is blocked after it is de-energized.

When a dosing process completes or the injector 460 is de-energized for a long time, then a purging process starts. In the purging process, both of the air flow control unit 445 and the injector 460 are energized and a compressed air is fed into the chamber 450 through the air line 441, the A and B ports of the air flow control unit 445, the air line 443, and the port 451. The compressed air further enters the injector 460 though the port 454 and the pressure line 440, pressing fluid residue in the injector out into the exhaust pipe. When the injector 460 is emptied, the air flow control unit and the injector 460 are de-energized, and the purging process completes.

Figure 5:
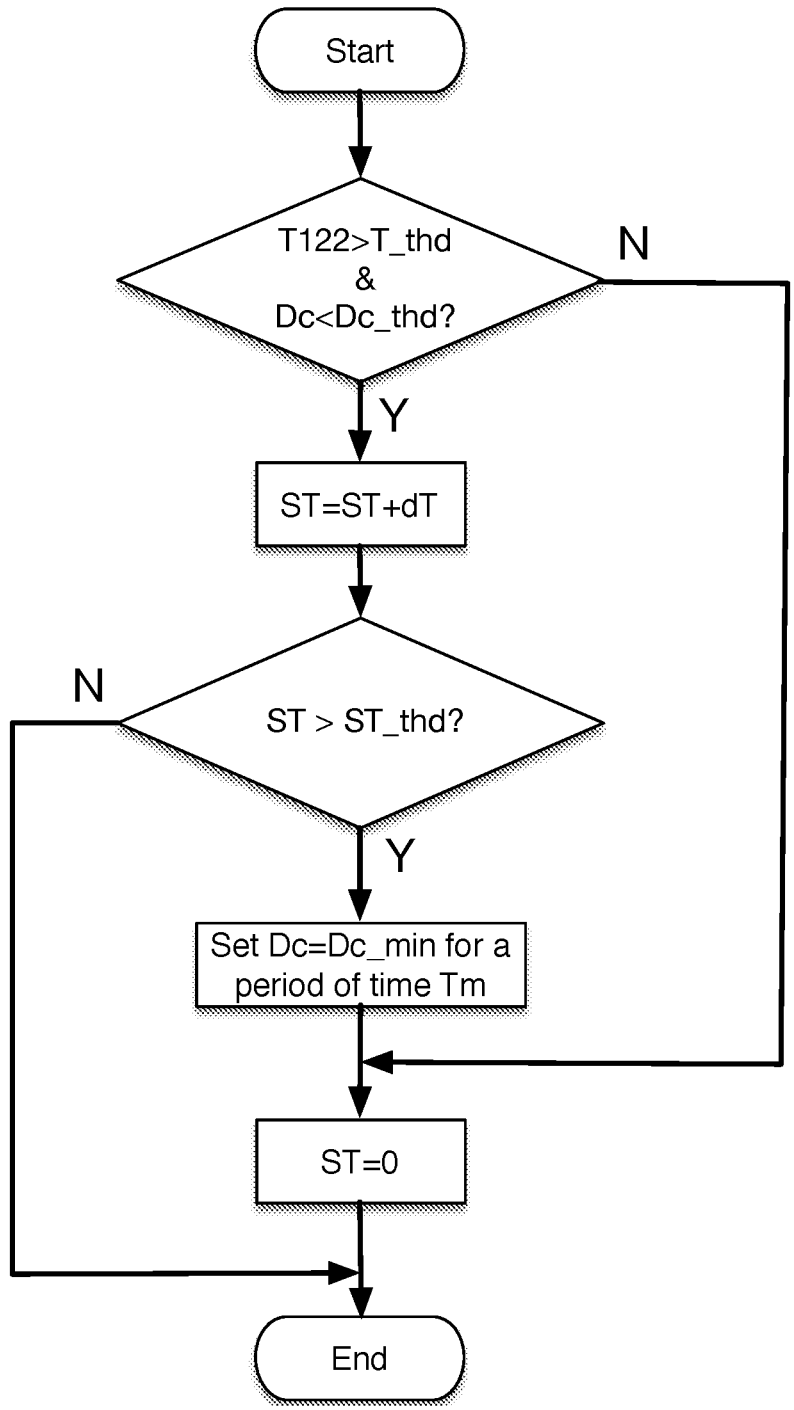
FIG. 5 is a flow chart of a service routine of a timer based interrupt running periodically for protecting an atomizing injector in a high-temperature working environment.

In addition to being exposed in ambient environment or exhaust air for a long time, working fluid in an injector may also solidify after being positioned too long in a high temperature stagnant environment. To avoid solidification of the working fluid, the injector can be further controlled to enable a minimum working fluid flow when the injector stalls in high temperature for a prolonged period of time. Referring back to FIG. 1b, in an exemplary SCR system, an anti-solidification routine running in the DCU 140 can be used for controlling the injector. The anti-solidification routine can be a service routine running periodically for a timer based interrupt with an interval time dT. As depicted in FIG. 5, in such a routine, a temperature T122, which is a temperature sensing value obtained from the temperature sensor T122 (FIG. 1b), is compared with a threshold T_thd, and a delivery rate command of the working fluid, Dc, according to which the injector 120 is controlled, is compared to a threshold Dc_Thd. When the T122 value is higher than T_thd, and the Dc value is lower than Dc_Thd, then a variable ST is incremented with the interrupt interval time dT, otherwise, the ST value is reset to 0 and the routine ends. After the ST value is incremented, the ST value is then compared with a threshold ST_Thd, if it is higher than ST_Thd, then the DC value is set to a minimum dosing rate value Dc_min for a period of time Tm, and the ST value is reset to 0. The routine ends thereafter.

Although the apparatus and method of the invention are described herein in relation to the preferred embodiments shown in FIGS. 1a-5, certain design alternations and modifications will become apparent to those of ordinary skill in the art upon reading this disclosure in connection with the accompanying drawings. It is intended, however, that the scope of the invention be limited only by the appended claims.

The invention claimed is:

1. An apparatus for delivering a working fluid into a working environment, comprising:
   a reservoir holding said working fluid;
   an atomizing injector fluidly coupled to said reservoir including: an upper injector body having a fluid inlet, a first fluid exit nozzle, and a needle valve movably disposed in between said fluid inlet and said first fluid exit nozzle, allowing a flow of said working fluid through said first fluid exit nozzle at an opening position and blocking said flow of said working fluid at a closed position, and a lower injector body in connection with said upper injector body having a second fluid exit nozzle in contact with said working environment, wherein said lower injector body has an atomization element positioned therein with a bottom end, a side portion, and an upper end, creating a swirl chamber in said lower injector body in between said bottom end of said atomization element and said second fluid exit nozzle, and a pre-atomization chamber in between said first fluid exit nozzle and said upper end of said atomization element;
   a control solenoid coil lifting said needle valve to said opening position when it is energized and releasing said needle valve back to said closed position when it is de-energized, and a flow rate of said working fluid is controlled by adjusting an energizing time of said control solenoid coil in a repeating cycle;
   a mixed fluid chamber with a first inlet port fluidly coupled to a compressed air source through an air flow control unit operable between a first position allowing an air flow passing therethrough and a second position blocking said air flow, and an outlet port fluidly coupled to said atomizing injector, and a fluid delivery controller electrically connected to said control solenoid coil and said air flow control unit, configured to energize said control solenoid coil and operate said air flow control unit in said first position to press out said working fluid after a working fluid delivery process completes; wherein said atomization element in said atomizing injector further has a plurality of swirling grooves on said bottom end for guiding said working fluid flowing into said swirl chamber in creating a swirling flow.

2. The apparatus of claim 1, wherein said first fluid exit nozzle in said atomizing injector has plural number of orifices.

3. The apparatus of claim 1, wherein at least one fluid passage connecting said pre-atomization chamber to said swirl chamber is enclosed by said side portion of said atomization element and said lower injector body.

4. The apparatus of claim 1, further comprising:
   a temperature sensor in communication with said fluid delivery controller providing a temperature sensing value indicative of a temperature in said working environment, wherein said fluid delivery controller is further configured to energize said control solenoid coil for a predetermined period of time after a duration, during which said temperature sensing value is higher than a predetermined value.

5. The apparatus of claim 1,
   wherein said fluid delivery controller is further configured to energize said control solenoid coil and operate said air flow control unit in said first position to press out said working fluid from said atomizing injector after said control solenoid coil is de-energized for longer than a predetermined period of time.

6. The apparatus of claim 1, further comprising:
   a temperature sensor in communication with said fluid delivery controller providing a temperature sensing value indicative of a temperature in said working environment, wherein said fluid delivery controller is further configured to control said flow rate of said working fluid in response to a flow rate command, and energize said control solenoid coil for a predetermined period of time after a duration, during which said temperature sensing value is higher than a first predetermined value and said flow rate command is lower than a second predetermined value.

7. An apparatus for delivering a working fluid into a working environment, comprising:
   a reservoir holding said working fluid;
   an atomizing injector fluidly coupled to said reservoir including: an upper injector body having a fluid inlet, a first fluid exit nozzle, and a needle valve movably disposed in between said fluid inlet and said first fluid exit nozzle, allowing a flow of said working fluid through said first fluid exit nozzle at an opening position and blocking said flow of said working fluid at a closed position, and a lower injector body in connection with said upper injector body having a second fluid exit nozzle in contact with said working environment, wherein said lower injector body has an atomization element positioned therein with a bottom end, a side portion, and an upper end, creating a swirl chamber in said lower injector body in between said bottom end of said atomization element and said second fluid exit nozzle, and a pre-atomization chamber in between said first fluid exit nozzle and said upper end of said atomization element;
   a control solenoid coil lifting said needle valve to said opening position when it is energized and releasing said needle valve back to said closed position when it is de-energized;

a pump with an inlet port fluidly coupled to said reservoir and an outlet port fluidly coupled to said atomizing injector, and a fluid delivery controller electrically connected to said control solenoid coil in said atomizing injector and said pump, wherein said fluid delivery controller is configured to energize said control solenoid coil and operate said pump to empty said atomizing injector after said control solenoid coil is de-energized for longer than a predetermined period of time; wherein said atomization element in said atomizing injector further has a plurality of swirling grooves on said bottom end for guiding said working fluid flowing into said swirl chamber in creating a swirling flow.

8. The apparatus of claim 7, further comprising:

a hydraulic buffer having a receiving port and a pressure port fluidly connected to said atomizing injector;

and a fluid flow control unit electrically connected to said fluid delivery controller having a first flow port fluidly connected to said inlet port of said pump, a second flow port fluidly connected to said outlet port of said pump, a third flow port fluidly connected to said reservoir, and forth flow port fluidly connected to said receiving port of said hydraulic buffer, wherein said fluid flow control unit is operable between a first position, in which said first flow port is fluidly connected to said third flow port and said second flow port is fluidly connected to said forth flow port, and a second position, in which said first flow port is fluidly connected to said forth flow port and said second flow port is fluidly connected to said third flow port.

9. The apparatus of claim 7, wherein said fluid delivery controller is further configured to energize said control solenoid coil, and operate said pump to empty said atomizing injector after a working fluid delivery process completes.

10. The apparatus of claim 7, wherein said first fluid exit nozzle in said atomizing injector has plural number of orifices.

11. The apparatus of claim 7, wherein at least one fluid passage connecting said pre-atomization chamber to said swirl chamber is enclosed by said side portion of said atomization element and said lower injector body.

12. The apparatus of claim 7, further comprising:

a temperature sensor in communication with said fluid delivery controller providing a temperature sensing value indicative of a temperature in said working environment, wherein said fluid delivery controller is further configured to energize said control solenoid coil for a predetermined period of time after a duration, during which said temperature sensing value is higher than a predetermined value.

13. The apparatus of claim 7, further comprising:

a temperature sensor in communication with said fluid delivery controller providing a temperature sensing value indicative of a temperature in said working environment, wherein said fluid delivery controller is further configured to control said flow rate of said working fluid in response to a flow rate command, and energize said control solenoid coil for a predetermined period of time after a duration, during which said temperature sensing value is higher than a first predetermined value and said flow rate command is lower than a second predetermined value.

* * * * *